United States Patent
Goyal et al.

(10) Patent No.: US 8,539,297 B1
(45) Date of Patent: Sep. 17, 2013

(54) DETERMINING WHETHER A WIRELESS ACCESS NODE SHOULD RETRANSMIT DATA PACKETS BASED ON THE CONDITION OF A REVERSE WIRELESS LINK

(75) Inventors: Anoop Kumar Goyal, Overland Park, KS (US); Sachin R. Vargantwar, Overland Park, KS (US); Manoj Shetty, Overland Park, KS (US); Siddharth S. Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 298 days.

(21) Appl. No.: 13/018,700

(22) Filed: Feb. 1, 2011

(51) Int. Cl.
*H04L 1/18* (2006.01)

(52) U.S. Cl.
USPC ............ 714/748; 370/317; 370/326

(58) Field of Classification Search
USPC ............... 714/748; 370/317, 326
See application file for complete search history.

(56) References Cited

U.S. PATENT DOCUMENTS

| | | | |
|---|---|---|---|
| 5,121,387 A * | 6/1992 | Gerhardt et al. ............ | 370/322 |
| 6,996,763 B2 | 2/2006 | Sarkar et al. | |
| 7,139,274 B2 | 11/2006 | Attar et al. | |
| 7,292,873 B2 | 11/2007 | Wei et al. | |
| 7,493,080 B2 * | 2/2009 | Scaglione et al. ............ | 455/9 |
| 7,852,824 B2 * | 12/2010 | Wang et al. .................. | 370/348 |
| 7,860,184 B2 * | 12/2010 | She et al. ..................... | 375/267 |
| 7,990,939 B2 * | 8/2011 | Takayanagi et al. .......... | 370/338 |
| 2002/0154610 A1 | 10/2002 | Tiedemann et al. | |
| 2004/0179480 A1 | 9/2004 | Attar et al. | |
| 2006/0136790 A1 | 6/2006 | Julian et al. | |
| 2007/0066340 A1 | 3/2007 | Yoon et al. | |
| 2007/0178927 A1 | 8/2007 | Fernandez-Corbaton et al. | |
| 2008/0052588 A1 | 2/2008 | Akash et al. | |
| 2008/0151829 A1 | 6/2008 | Khandekar et al. | |
| 2009/0044065 A1 * | 2/2009 | She et al. ..................... | 714/748 |

* cited by examiner

*Primary Examiner* — Esaw Abraham

(57) ABSTRACT

Embodiments disclosed herein provide systems and methods for determining whether a wireless device should retransmit data packets based on the condition of a reverse wireless link. In a particular embodiment, a method provides exchanging wireless data packet communications between a wireless device and an access node on a wireless network. The method further provides transmitting a first packet set from the access node to the wireless device on a forward wireless link. The method further provides determining a reverse noise ratio, signal interference noise ratio, and packet error rate on a reverse wireless link and generating a confidence level indicator based on the reverse noise ratio, signal interference noise ratio, and packet error rate. The method further provides determining whether to retransmit the first packet set from the access node to the wireless device based on the confidence level indicator.

20 Claims, 7 Drawing Sheets

DETERMINING WHETHER A WIRELESS ACCESS NODE SHOULD RETRANSMIT DATA PACKETS BASED ON THE CONDITION OF A REVERSE WIRELESS LINK

TECHNICAL BACKGROUND

Modern wireless communication devices are capable of exchanging data with wireless communication networks. This data is transferred in the form of data packets that bundle the digital data together into more manageable segments. When a data packet or set of data packets are sent from a wireless access node on a wireless communication network to a wireless device via a forward wireless link, the wireless device will transfer an acknowledgment message back to the access node via a reverse wireless link. This acknowledgment message informs the access node that the wireless device received the data packets correctly. If the access node does not receive an acknowledgment message or receives a message indicating an error in packet transmission, then the access node will resend the data packets.

In some cases, the packets may be transferred correctly but an acknowledgment message from the wireless device is not received in the access node. The non-receipt of the acknowledgment message may be due to poor conditions on the reverse wireless link. Consequently, the access node may determine that the wireless device did not receive the packets and, thereby, will retransmit the packets due to a condition of the reverse wireless link that caused the non-receipt of the acknowledgment message instead of a condition of the forward wireless link that actually sends the packets. This retransmission of the packets is unnecessary, uses network resources, and delays the transmission of further packets to the wireless device.

OVERVIEW

Embodiments disclosed herein provide systems and methods for determining whether a wireless device should retransmit data packets based on the condition of a reverse wireless link. In a particular embodiment, a method provides exchanging wireless data packet communications between a wireless communication device and an access node on a wireless communication network. The method further provides transmitting a first packet set from the access node to the wireless communication device on a forward wireless communication link. The method further provides determining a reverse noise ratio, signal interference noise ratio, and packet error rate on a reverse wireless communication link and generating a confidence level indicator, which indicates a confidence as to whether the first packet set was received by the wireless communication device and an acknowledgment message was transferred from the wireless communication device, based on the reverse noise ratio, signal interference noise ratio, and packet error rate. The method further provides determining whether to retransmit the first packet set from the access node to the wireless communication device based on the confidence level indicator.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
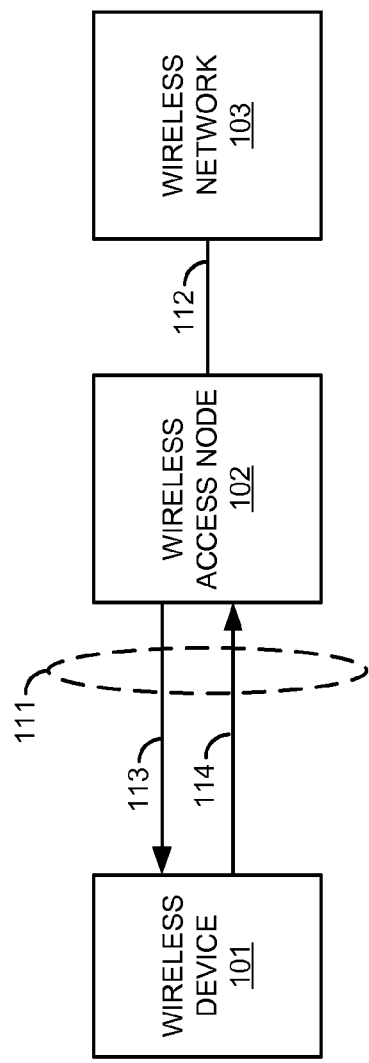
FIG. 1 illustrates a wireless communication system for determining whether a wireless device should retransmit data packets based on the condition of a reverse wireless link.

FIG. 1 illustrates wireless communication system 100. Wireless communication system 100 includes wireless communication device 101, wireless access node 102, and wireless communication network 103. Wireless communication device 101 and wireless access node 102 communicate over wireless link 111. Wireless access node 102 and wireless communication network 103 communicate over communication link 112. Wireless communication link 111 includes forward wireless communication link 113 and reverse wireless communication link 114.

In operation, wireless device 101 exchanges data packets with wireless network 103 via access node 102. The data packets may be for any type of data communication for wireless device 101, such as a VoIP call, email, and web browsing. Data packets traveling to wireless device 101 from access node 102 travel on forward link 113 and data packet traveling to access node 102 from wireless device 101 travel on reverse link 114.

Packets traveling between wireless device 101 and access node 102 are not always received in wireless device 101 and access node 102 as they were sent. Specifically, when packets are transmitted to wireless device 101 from access node 102, wireless device 101 will determine whether the packets received were received correctly as they were intended from access node 102. If the packets were received correctly, then wireless device 101 will transfer an acknowledgment message that confirms the receipt of the packets to access node 102. The acknowledgment message is transferred to access node 102 on reverse link 114. If the packets were not received successfully, then wireless device 101 will not transfer an acknowledgment message and access node 102 will continue to retransmit the packets to wireless device 101 until access node 102 receives an acknowledgment message from wireless device 101.

In some cases, packets transmitted from access node 102 may be received successfully by wireless device 101 but an acknowledgment message confirming the receipt of the packets from wireless device 101 may not be received by access node 102. In those instances, access node 102 may unnecessarily retransmit data packets even though the packets were already successfully received by wireless device 101. Therefore, while forward link 113 is capable of transferring packets correctly to wireless device 101, reverse link 114 is not able to transfer packets, such as an acknowledgment message, to access node 102. This situation essentially leads to access node 102 determining that packets need to be retransmitted on forward link 113 based on the condition of reverse link 114 rather than the condition of forward link 113, which is the link that is actually transferring the packets.

Figure 2:
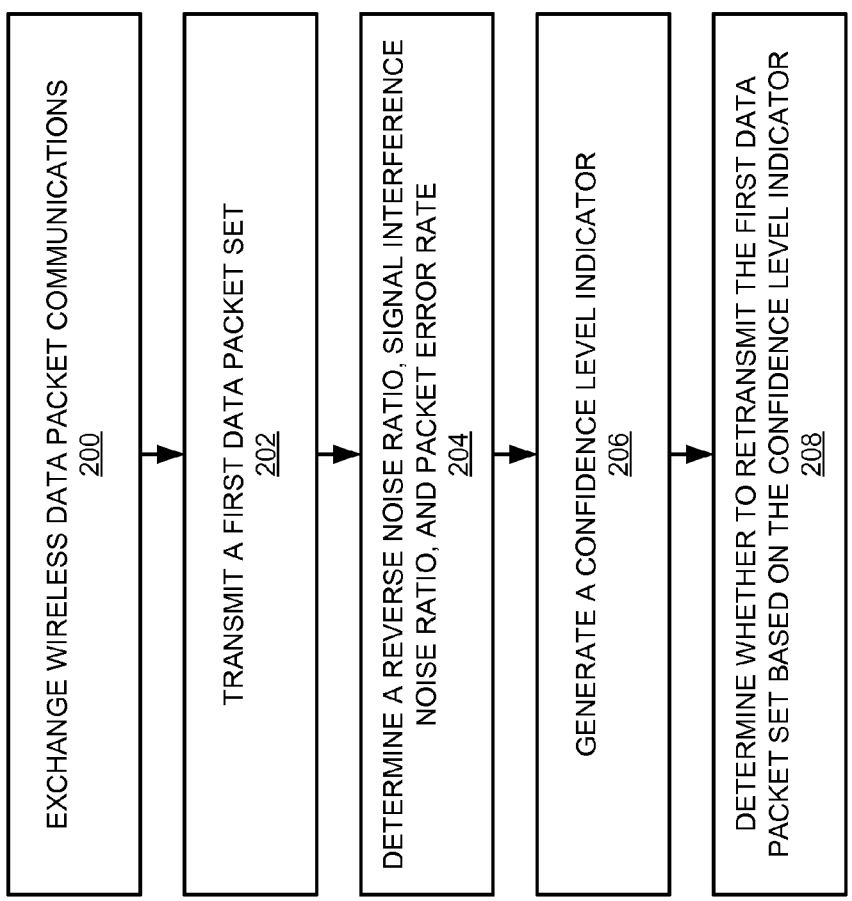
FIG. 2 illustrates the operation of a wireless communication system to determine whether a wireless device should retransmit data packets based on the condition of a reverse wireless link.

FIG. 2 illustrates the operation of wireless communication system 100 to determine whether access node 102 should retransmit data packets based on the condition of reverse link 114. The operation begins with wireless device 101 exchanging wireless data packet communications between wireless device 101 and access node 102 on wireless network 103 (step 200). The data packets transferred to wireless device 101 are transferred on forward link 113 and the data packets transferred to access node 102 are transferred on reverse link 114. The data packets are for any type of data communications that wireless device 101 exchanges with wireless network 103 via access node 102, such as email, web browsing, audio, or video.

Access node 102 transmits a first packet set to wireless device 101 on forward link 113 (step 202). The first packet set is a set of data packets including at least one data packet. The first packet set may be a subset of the data communications that access node 102 needs to transfer to wireless device 101 for a particular task or may be the entirety of the data communications that access node 102 needs to transfer to wireless device 101. For example, the first packet set may be an entire email message or just part of the email message.

A reverse noise ratio, signal interference noise ratio, and packet error rate are determined on reverse wireless communication link 114 (step 204). The reverse noise ratio is a ratio of the power level of the communication signal from wireless device 101 compared to the power level of the communication signals received by access node 102 from other wireless devices. The signal interference noise ratio is a ratio of the power level of the communication signal from wireless device 101 compared to the power level of any other electromagnetic radiation received by access node 102. The packet error rate is the rate at which packets that contain errors are received in access node 102 from wireless device 101 and may include packets that are not received at all. For example, the packet error rate may be a percentage of packets from wireless device 101 that are not received correctly.

Step 204 may be performed in access node 102, an independent reverse link condition system, or in some other system of wireless network 103.

A confidence level indicator is generated, which indicates a confidence as to whether the first packet set was received by wireless device 101 and an acknowledgment message was transferred from the wireless device 101, based on the reverse noise ratio, signal interference noise ratio, and packet error rate (step 206). In other words the confidence level indicator provides a confidence as to whether reverse link 114 is capable of transferring an acknowledgement message from wireless device 101 after wireless device 101 receives the first packet set. The confidence level indicator may be a numeric value, such as a percentage, representing an amount of confidence that a packet was transferred successfully on forward link 113 to access node 102. The confidence level indicator may also be some other form of indication, such as high, medium, or low confidence.

Generating the confidence level indicator balances the reverse noise ratio, the signal interference noise ratio, and the packet error rate. If either the reverse noise ratio or the signal interference noise ratio increases, then the chance that packets will be received successfully also increases. Therefore, the confidence level indicator will also indicate an increased confidence that packets transferred from wireless device 101, such as an acknowledgment message, will be received by access node 102 than was indicated before the increase in either or both of the noise ratios. Likewise, if the packet error rate decreases, then the confidence level indicator should also increase accordingly. Conversely, if either of the noise ratios decreases or the packet error rate increases, then the confidence level indicator will indicate a lower confidence of packet receipt than was previously indicated.

Each of these factors may be weighted differently when balanced against the others. For example, the packet error rate may affect the confidence level indicator more than the reverse noise ratio.

Step 206 may be performed in access node 102, an independent confidence level determination system, or in some other system of wireless network 103.

Access node 102 then determines whether to retransmit the first packet set to wireless device 101 based on the confidence level indicator (step 208). If the confidence level indicator indicates to access node 102 a low enough level of confidence in the ability of reverse link 114 to transfer an acknowledgment message to access node 102, then access node 102 does not retransmit the first packet set. The first packet set is not retransmitted because access node 102 assumes that wireless device 101 received the first packet set but an acknowledgment message from wireless device 101 did not successfully travel on reverse link 114. However, if the confidence level indicator does not indicate to wireless device 101 a low enough level of confidence, then access node 102 retransmits the first packet set to access node 102. Access node 102 retransmits the first packet set because access node 102 assumes that if wireless device 101 received the first packet set, then reverse link 114 is capable of transferring an acknowledgment message that was not received by access node 102. Thus, wireless device 101 requires that the first packet set be retransmitted. The first packet set may continue to be retransmitted until either the confidence level is low enough to indicate a poor confidence in reverse link 114 or access node 102 receives an acknowledgment message from wireless device 101 indicating that the first packet set has been received.

Access node 102 may make the determination based on a threshold confidence level value. For example, if the threshold value is 40% and the confidence level indicator is at 71%, then the first packet set will be retransmitted upon non-receipt of an acknowledgment message because the confidence level indicator is above the threshold. In other words, there is a high enough confidence in the ability of reverse link 114 to transfer an acknowledgment message that, when no acknowledgment is received, access node 102 is able to assume that none was ever sent. There may exist different threshold values depending on various other factors including the type of application transmitting the first packet set, importance of the first packet set, other network conditions, or any other factor that access node 102 may take into account when determining whether to retransmit packets. For example, if the first packet set is part of real time communications that are not as concerned with dropped packets, then the threshold may be set very high so that the next packet set will be sent even with high confidence that an acknowledgment would have been sent had the first packet set actually been received.

Alternatively, the confidence level indicator may be a yes or no value that informs access node 102 as to whether retransmission of the first packet set is necessary without the need to make a further determination. If the confidence level indicator says that packets should be resent, then the packets are resent upon non-receipt of an acknowledgment message. If the confidence level indicator says that the packets should not be resent, then the packets are not resent.

In some embodiments, if an acknowledgment message is still not received after multiple retransmissions, then access node 102 may determine a number of times to continue to retransmit the first packet set based on the confidence level indicator. For example, a lower confidence indication may tell access node 102 to perform fewer resend attempts before moving on to the next packet set than would a higher confidence indication.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless communication network 103 comprises network elements that provide wireless devices with wireless communication access to packet communication services. Wireless network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
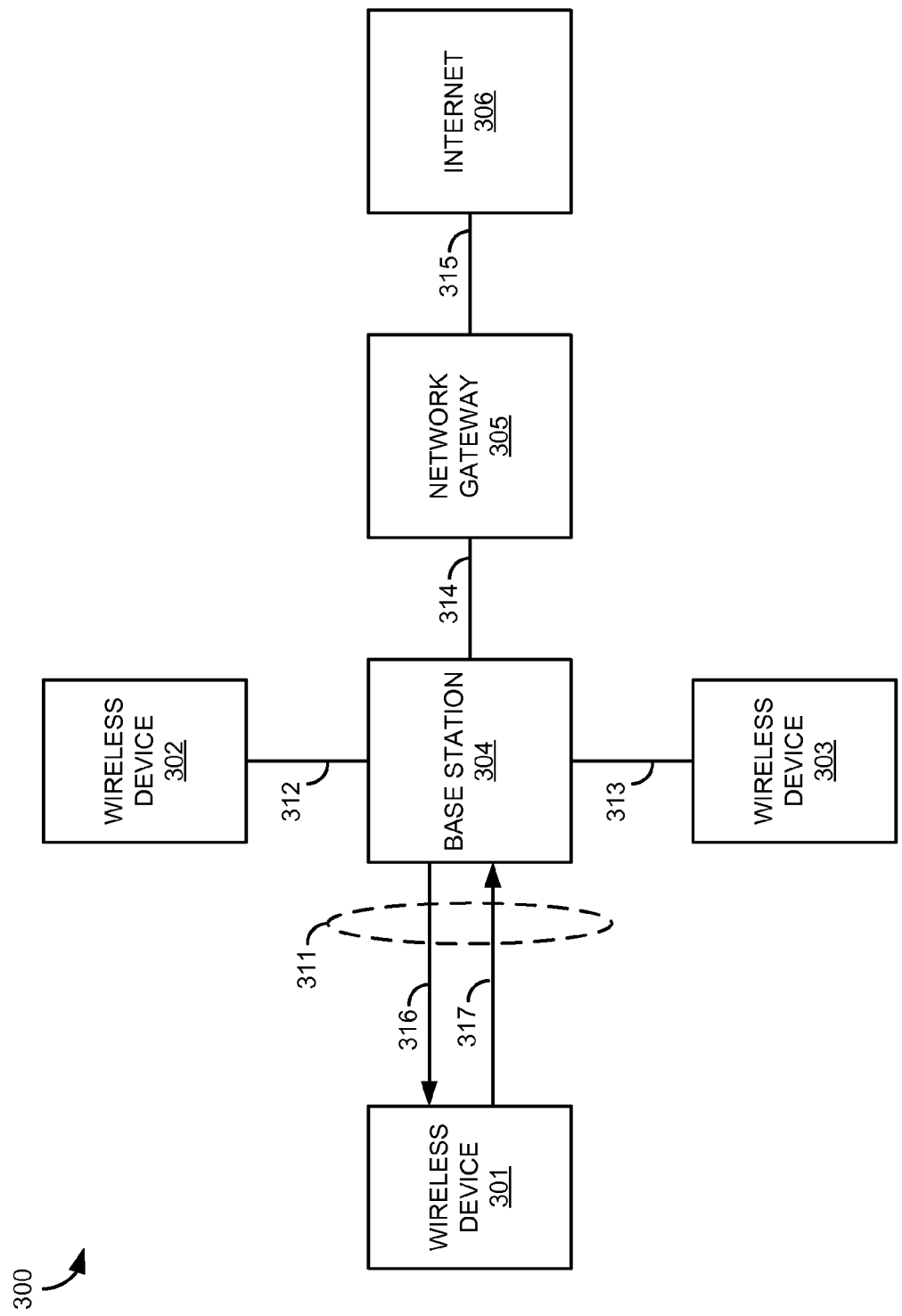
FIG. 3 illustrates a wireless communication system for determining whether a wireless device should retransmit data packets based on the condition of a reverse wireless link.

FIG. 3 illustrates wireless communication system 300. Wireless communication system 300 includes wireless communication devices 301-303, base station 304, network gateway 305, and Internet 306. Wireless communication devices 301-303 and base station 304 communicate over wireless links 311-313, respectively. Base station 304 and network gateway 305 communicate over communication link 314. Network gateway 305 and Internet 306 communicate over communication link 315. Wireless link 311 includes forward wireless communication link 316 and reverse wireless communication link 317. Though not shown, wireless links 312 and 313 may each also include these forward and reverse links.

Figure 4:
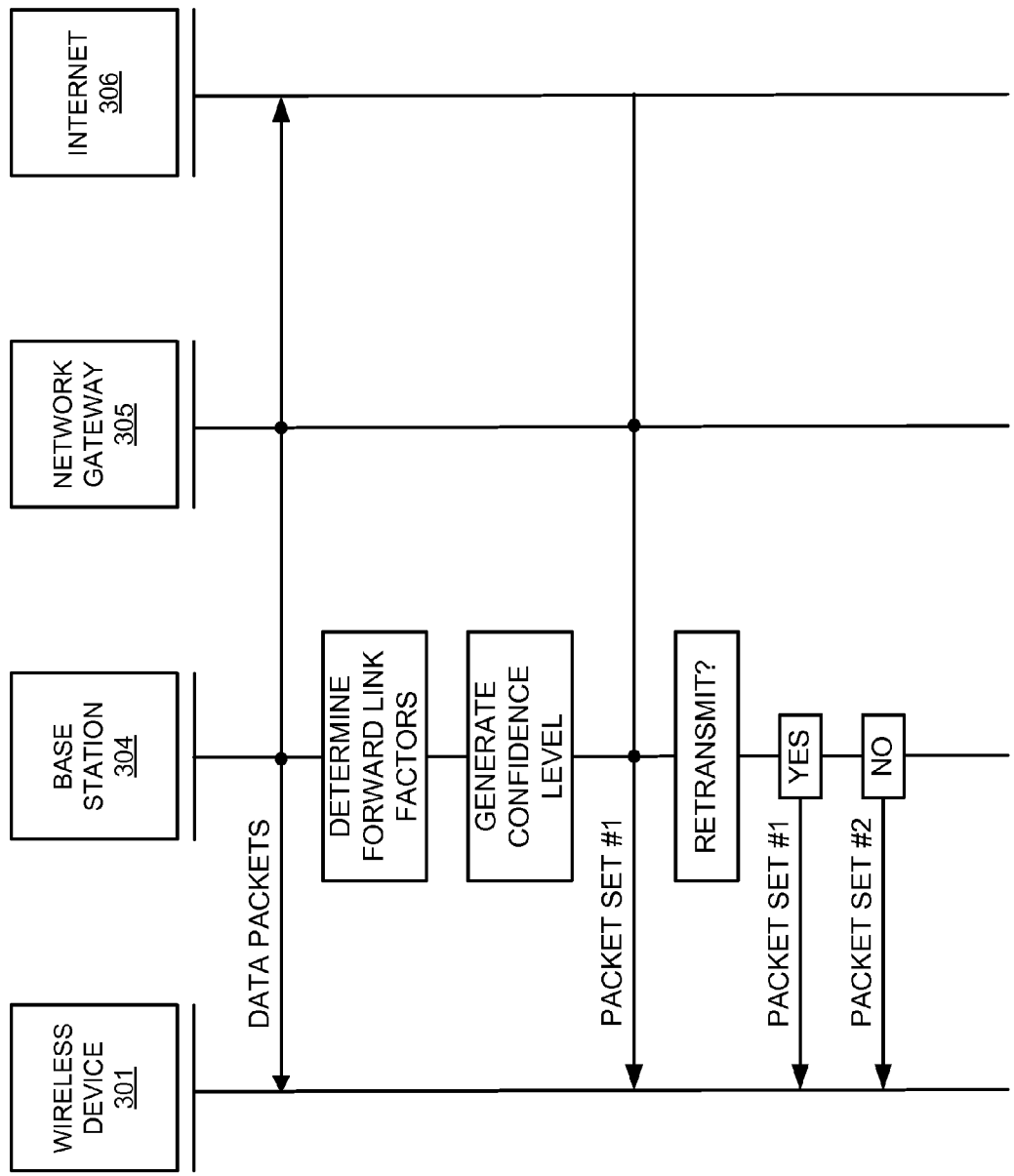
FIG. 4 is a sequencing diagram illustrating the operation of a wireless communication system to determine whether a wireless device should retransmit data packets based on the condition of a reverse wireless link.

FIG. 4 is a sequence diagram illustrating the operation of wireless communication system 300 to determine whether wireless device 301 should retransmit data packets based on the condition of reverse link 317. In this example, wireless device 301 is exchanging data packets for a VoIP call with Internet 306 via base station 304 and network gateway 305. While wireless device 301 is exchanging packets with Internet 306, base station 304 determines factors concerning the condition of reverse link 317. These factors include a reverse noise ratio, signal interference noise ratio, and packet error rate on reverse link 317.

The reverse noise ratio is a ratio of the power level of the communication signal on reverse link 317 to the power level of the communication signal received in base station 304 from wireless devices 302 and 303. The signal interference noise ratio is a ratio of the power level of the communication signal on reverse link 317 to any other electromagnetic radiation, not just the signals from wireless devices 302 and 303, received in base station 304. The packet error rate on reverse link 317 is a number of packets that are not received correctly in base station compared to the number of packets transferred from wireless device 301. The packet error rate may be determined over any length of time or over any number of transferred packets. For example, a packet error rate for the past ten seconds or a packet error rate for the past 100 packets transferred to base station 304.

Base station 304 then determines a confidence level that packets transferred over reverse link 317, such as an acknowledgment message, will be received by base station 304 and generates a confidence level indicator that indicates the determined confidence. The confidence level indicator is a percentage that shows the confidence on a scale of 0-100. Higher percentages correspond to higher confidence that packets will be received in base station 304.

Base station 304 transfers a first packet set of the VoIP call to wireless device 301 after determining the confidence level indicator. When base station 304 does not receive an acknowledgment message from wireless device 301, which indicates that the first packet set was successfully transferred to wireless device 301, base station 304 determines whether to resend the first packet set based on the confidence level indicator. Therefore, rather than simply resending the first packet set due to the lack of an acknowledgment message, base station 304 makes further inquiry into the condition of reverse link 317 using the confidence level indicator.

If the confidence level indicator provides a percentage of confidence in the condition of reverse link 317 that is above a confidence threshold, then base station 304 retransmits the first packet set because an acknowledgment message may have been sent by wireless device 301 but not received by base station 304 over reverse link 317. If the confidence level indicator provides a percentage of confidence in the condition of reverse link 317 that is below a confidence threshold, then wireless device 301 does not retransmit the first packet set because an acknowledgment message would most likely have been received had one been sent. Instead, wireless device 301 moves on to transmitting the next packet set in the VoIP call session.

The same confidence level indicator may be used to determine whether subsequent packet sets should be retransmitted if an acknowledgment message still is not received. However, base station 304 may instead continue to periodically measure the reverse noise ratio, signal interference noise ratio, and packet error rate in order to adjust the confidence level indicator to reflect current conditions on reverse link 317. Base station 304 will then use the adjusted confidence level indicator when determining whether to retransmit subsequent packet sets.

Figure 5:
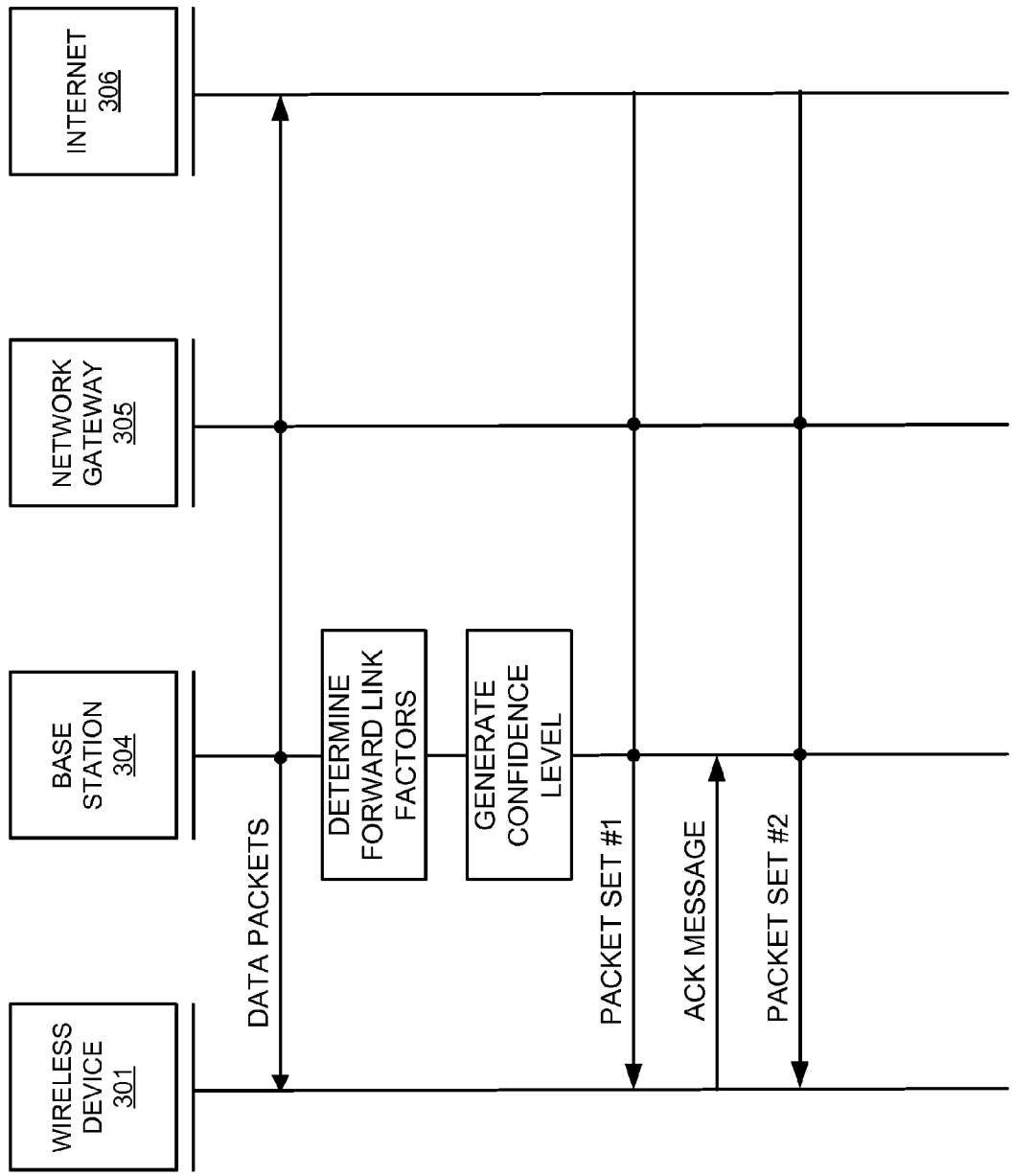
FIG. 5 is a sequencing diagram illustrating the operation of a wireless communication system to determine whether a wireless device should retransmit data packets based on the condition of a reverse wireless link.

FIG. 5 is a sequence diagram illustrating the operation of wireless communication system 300 to determine whether wireless device 301 should retransmit data packets based on the condition of reverse link 317. In this example, wireless device 301 is exchanging data packets for a VoIP call with Internet 306 via base station 304 and network gateway 305. While wireless device 301 is exchanging packets with Internet 306, base station 304 determines factors concerning the condition of reverse link 317. These factors include a reverse noise ratio, signal interference noise ratio, and packet error rate on reverse link 317.

The reverse noise ratio is a ratio of the power level of the communication signal on reverse link 317 to the power level of the communication signal received in base station 304 from wireless devices 302 and 303. The signal interference noise ratio is a ratio of the power level of the communication signal on reverse link 317 to any other electromagnetic radiation, not just the signals from wireless devices 302 and 303, received in base station 304. The packet error rate on reverse link 317 is a number of packets that are not received correctly in base station compared to the number of packets transferred from wireless device 301. The packet error rate may be determined over any length of time or over any number of transferred packets. For example, a packet error rate for the past ten seconds or a packet error rate for the past 100 packets transferred to base station 304.

Base station 304 then determines a confidence level that packets transferred over reverse link 317, such as an acknowledgment message, will be received by base station 304 and generates a confidence level indicator that indicates the determined confidence. The confidence level indicator is a percentage that shows the confidence on a scale of 0-100. Higher percentages correspond to higher confidence that packets will be received in base station 304.

Base station 304 transfers a first packet set of the VoIP call to wireless device 301 after determining the confidence level indicator. Wireless device 301 receives the first packet set, determines that the first packet set was received correctly, and transfers an acknowledgment message confirming the receipt of the first packet set to base station 304. Upon receiving the acknowledgment message, base station 304 does not need to use the confidence level indicator to determine whether the first packet set should be resent because the acknowledgment message confirms receipt of the first packet set. Since, the first packet set was received correctly, base station 304 transfers the second packet set for the VoIP session to wireless device 301.

In some examples, wireless device 301 may send an acknowledgment message that indicates that the first packet set was not received correctly, as would be the case if the first packet set contained too many errors or was not received in its entirety. In those examples, base station 304 will retransmit the first packet set because the acknowledgment message indicates that the first packet set should be resent.

Figure 6:
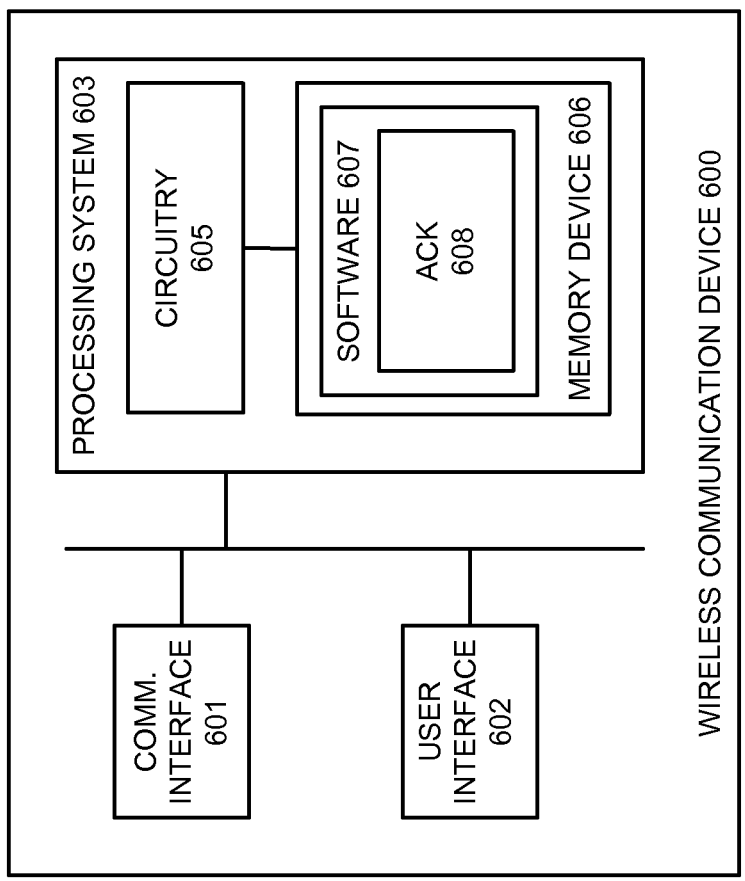
FIG. 6 illustrates a wireless communication device for determining whether a wireless device should retransmit data packets based on the condition of a reverse wireless link.

FIG. 6 illustrates wireless communication device 600. Wireless communication device 600 is an example of wireless communication devices 101 and 301, although devices 101 and 301 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 601 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format.

Wireless communication interface 601 is configured to exchange wireless data packet communications with a wireless access node on a wireless communication network, receive a first packet set from the access node on a forward wireless communication link, and transfer acknowledgment messages to the wireless access node.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes acknowledgment module 608. Operating software 607 may also include an operating system, utilities, drivers, network interfaces, applications, or some other type of software. When executed by processing circuitry 605, operating software 607 directs processing system 603 to operate wireless communication device 600 as described herein.

In particular, acknowledgment module 608 of operating software 607 directs processing system 603 to determine whether an acknowledgment message should be sent to a wireless access node indicating that packets were received correctly.

Figure 7:
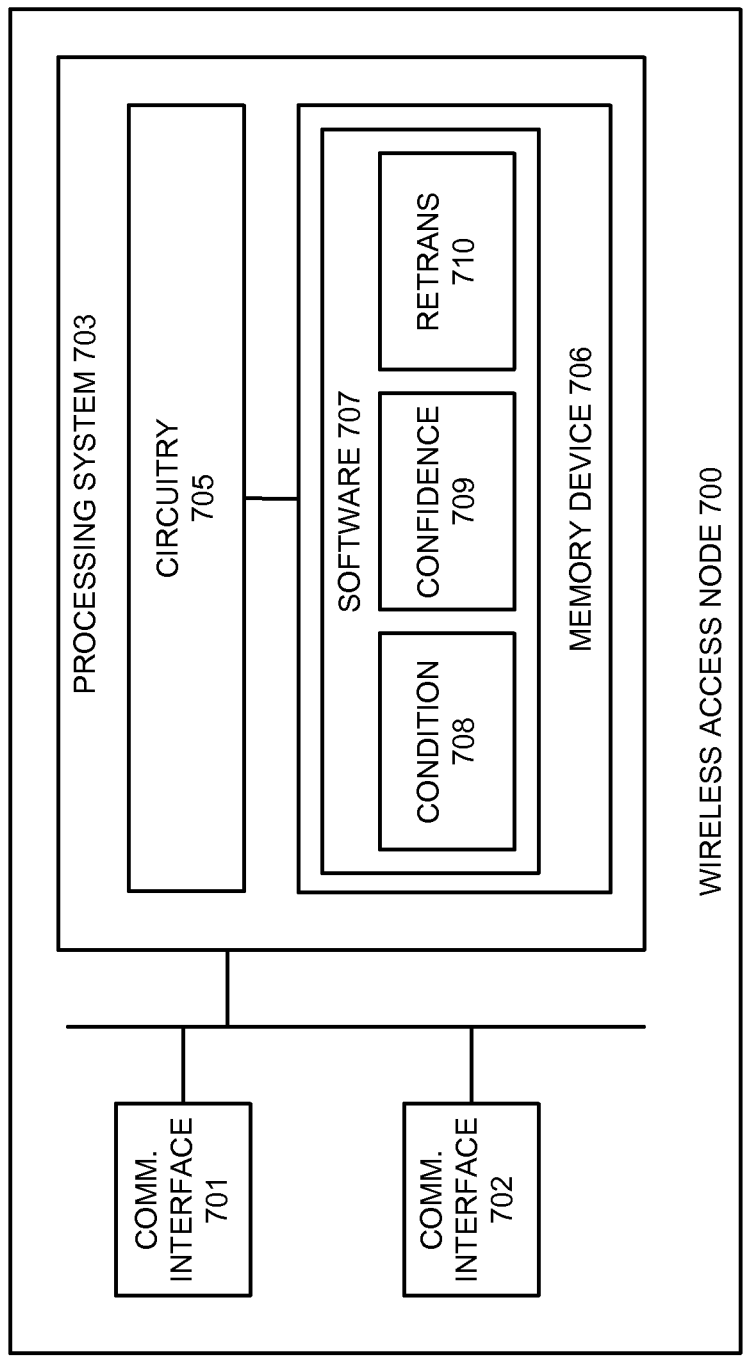
FIG. 7 illustrates a wireless access node for determining whether a wireless device should retransmit data packets based on the condition of a reverse wireless link.

FIG. 7 illustrates wireless access node 700. Wireless communication device 700 is an example of wireless access node 102 and base station 304, although access node 102 and base station 304 could use alternative configurations. Wireless access node 700 comprises wireless communication interface 701, communication interface 702, and processing system 703. Processing system 703 is linked to wireless communication interface 701 and user interface 702. Processing system 703 includes processing circuitry 705 and memory device 706 that stores operating software 707.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

Wireless communication interface 701 is configured to exchange wireless data packet communications with a wireless communication device and transmit a first packet set to the wireless device on a forward wireless communication link.

Communication interface 702 comprises components that communicate over communication links, such as network cards, ports, RF transceivers, processing circuitry and software, or some other communication devices. Communication interface 702 may be configured to communicate over metallic, wireless, or optical links. Communication interface 702 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes forward link condition module 708, confidence level determination module 709, and retransmit determination module 710. Operating software 707 may also include an operating system, utilities, drivers, network interfaces, applications, or some other type of software. When executed by processing circuitry 705, operating software 707 directs processing system 703 to operate wireless communication device 700 as described herein.

In particular, forward link condition module 708 of operating software 707 directs processing system 703 to determine a reverse noise ratio, signal interference noise ratio, and packet error rate on a reverse wireless communication link. Confidence level determination module 709 of operating software 707 directs processing system 703 to generate a confidence level indicator, which indicates a confidence as to whether the first packet set was received by the wireless communication device and an acknowledgment message was transferred from the wireless communication device, based on the reverse noise ratio, signal interference noise ratio, and packet error rate. Retransmit determination module 710 directs processing system 703 to determine whether to retransmit the first packet set to the wireless communication device based on the confidence level indicator.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
    exchanging wireless data packet communications between a wireless communication device and an access node on a wireless communication network;
    transmitting a first packet set from the access node to the wireless communication device on a forward wireless communication link;
    determining a reverse noise ratio, signal interference noise ratio, and packet error rate on a reverse wireless communication link;
    generating a confidence level indicator, which indicates a confidence as to whether the first packet set was received by the wireless communication device and an acknowledgment message was transferred from the wireless communication device, based on the reverse noise ratio, signal interference noise ratio, and packet error rate; and
    determining whether to retransmit the first packet set from the access node to the wireless communication device based on the confidence level indicator.

2. The method of claim 1 further comprising retransmitting the first packet set from the wireless communication device to the access node if the confidence level indicator meets a requirement for retransmission.

3. The method of claim 2 wherein the requirement for retransmission is a threshold confidence level value and the requirement for retransmission is met if the confidence level indicator is above the threshold confidence level value.

4. The method of claim 2 wherein the first packet set is not retransmitted if the acknowledgment message is received in the access node.

5. The method of claim 1 further comprising transmitting a second packet set from the access node to the wireless communication device if the confidence level indicator does not meet a requirement for retransmission.

6. The method of claim 1 wherein determining whether to retransmit the first packet set from the access node to the wireless communication device is further based on a data type for the first packet set.

7. The method of claim 1 wherein the step of determining the reverse noise ratio, signal interference noise ratio, and packet error rate is performed in the access node.

8. The method of claim 1 wherein the confidence level indicator comprises a yes or no indication as to whether the first packet set should be retransmitted.

9. The method of claim 1 wherein the confidence level indicator comprises a percentage.

10. The method of claim 1 wherein the wireless data communications, including the first packet set, are exchanged in an Evolution-Data Optimized (EV-DO) protocol.

11. A wireless communication system comprising:
    a wireless communication device configured to exchange wireless data packet communications with an access node on a wireless communication network;
    the access node configured to transmit a first packet set to the wireless communication device on a forward wireless communication link;
    a reverse link condition system configured to determine a reverse noise ratio, signal interference noise ratio, and packet error rate on a reverse wireless communication link;

a confidence level determination system configured to generate a confidence level indicator, which indicates a confidence as to whether the first packet set was received by the wireless communication device and an acknowledgment message was transferred from the wireless communication device, based on the reverse noise ratio, signal interference noise ratio, and packet error rate; and the access node further configured to determine whether to retransmit the first packet set from the access node to the wireless communication device based on the confidence level indicator.

12. The wireless communication system of claim 11 wherein the access node is configured to retransmit the first packet set to the wireless communication device if the confidence level indicator meets a requirement for retransmission.

13. The wireless communication system of claim 12 wherein the requirement for retransmission is a threshold confidence level value and the requirement for retransmission is met if the confidence level indicator is above the threshold confidence level value.

14. The wireless communication system of claim 12 wherein the access node is configured to not retransmit the first packet set if the acknowledgment message is received in the access node.

15. The wireless communication system of claim 11 wherein the access node is further configured to transmit a second packet set to the wireless communication device if the confidence level indicator does not meet a requirement for retransmission.

16. The wireless communication system of claim 11 wherein the access node is further configured to determine whether to retransmit the first packet set to the wireless communication device based on a data type for the first packet set.

17. The wireless communication system of claim 11 wherein the confidence level determination system is located in the access node.

18. The wireless communication system of claim 11 wherein the confidence level indicator comprises a yes or no indication as to whether the first packet set should be retransmitted.

19. The wireless communication system of claim 11 wherein the confidence level indicator comprises a percentage.

20. The wireless communication system of claim 11 wherein the wireless data communications, including the first packet set, are exchanged in an Evolution-Data Optimized (EV-DO) protocol.

* * * * *